United States Patent
Moliton

(10) Patent No.: US 7,922,322 B2
(45) Date of Patent: Apr. 12, 2011

(54) DISPLAY FOR MOUNTING ON A PAIR OF EYEGLASSES

(75) Inventor: Renaud Moliton, Charenton-le-Pont (FR); Cécile Bonafos, legal representative, Paris (FR)

(73) Assignee: Essilor International (FR)

( * ) Notice: Subject to any disclaimer, the term of this patent is extended or adjusted under 35 U.S.C. 154(b) by 276 days.

(21) Appl. No.: 11/825,416

(22) PCT Filed: Dec. 6, 2005

(86) PCT No.: PCT/EP2005/056541
§ 371 (c)(1),
(2), (4) Date: Dec. 8, 2009

(87) PCT Pub. No.: WO2006/072524
PCT Pub. Date: Jul. 13, 2006

(65) Prior Publication Data
US 2010/0141892 A1 Jun. 10, 2010

(30) Foreign Application Priority Data
Jan. 10, 2005 (FR) ...................................... 05 50077

(51) Int. Cl.
*G02C 1/00* (2006.01)
(52) U.S. Cl. ........................................... 351/158; 345/8
(58) Field of Classification Search ................... 351/41, 351/158; 361/679.01; 345/7, 8
See application file for complete search history.

(56) References Cited

U.S. PATENT DOCUMENTS

| | | | | |
|---|---|---|---|---|
| 6,034,653 | A | 3/2000 | Robertson et al. | 345/8 |
| 6,249,386 | B1 | 6/2001 | Yona et al. | 359/630 |
| 6,474,808 | B1 * | 11/2002 | Bettinger | 351/41 |
| 2002/0021407 | A1 * | 2/2002 | Elliott | 351/158 |
| 2004/0113867 | A1 | 6/2004 | Tomine et al. | 345/8 |
| 2004/0252077 | A1 | 12/2004 | Terasaki | 345/8 |

* cited by examiner

*Primary Examiner* — Huy K Mai
(74) *Attorney, Agent, or Firm* — Sofer & Haroun, LLP

(57) ABSTRACT

The invention relates to a display (1) for mounting on a pair of eyeglasses (2), the display comprising an electronic and optical system for generating light beams (20A) and an imager (20B) for shaping the light beams coming therefrom, the display including a releasable securing arrangement for releasably securing it on the pair of eyeglasses, and an adjustment arrangement for adjusting the position of said imager relative to the eye of the wearer. According to the invention, the display comprises two elements, a first element (10) carrying said removable securing arrangement, and a second element (20) including said electronic and optical system and said imager, and connectable to said first element via said adjustment arrangement for adjusting the pupillary distance and including position-locking means for locking it in the adjusted position.

14 Claims, 3 Drawing Sheets

DISPLAY FOR MOUNTING ON A PAIR OF EYEGLASSES

RELATED APPLICATIONS

This application is a National Phase application of PCT/EP2005/056541, filed on Dec. 5, 2005, which in turn claims the benefit of priority from French Patent Application No. 05 50077, filed on Jan. 10, 2005, the entirety of which are incorporated herein by reference

FIELD OF THE INVENTION

The invention relates to a display for mounting on a pair of eyeglasses.

BACKGROUND OF THE INVENTION

Such an ophthalmic display comprises an optical imager for projecting information, of the image or multimedia type. The optical imager serves to shape the light beams coming from an electronic and optical system for generating light beams from an electronic signal, e.g. a system of the miniature screen, laser diode, or light-emitting diode type, for example. The optical imager directs the light beams towards the eye of the user so as to enable the information content to be viewed.

Such a display can be used for viewing multimedia content from a mobile telephone, from a digital player, from a personal computer, from a games console, or from any other device suitable for delivering multimedia content.

The term "display" is used herein to mean an assembly constituted by the optical imager and the electronic and optical system for generating light beams. The conventional elements of the pair of eyeglasses are known as the frame and the ophthalmic lenses carried by the frame.

U.S. Pat. No. 6,204,974 discloses fastening a display on a frame for eyeglasses.

In a first variant, the display is clipped onto the frame, and more precisely onto one of the branches (temples) of the frame.

That type of fastening thus includes an arrangement for releasably securing the display on the frame, enabling the display to be secured on the wearer's pair of eyeglasses when it is desired to use the display, and enabling it to be separated therefrom when so desired, with the eyeglasses then being used in conventional manner.

Nevertheless, that type of fastening does not make any provision for adjusting the imager to match the characteristics of the wearer, such as pupillary distance, for example, where the purpose of such adjustment is to present the wearer with an image that is complete, i.e. an image having no portion thereof hidden by a vignetting phenomenon.

In a second variant, the display comprises an imager hinged on the associated electronic and optical system for generating light beams. That type of display can likewise be clipped onto a branch of a frame.

Although that type of display does indeed provide a releasable arrangement for securing the display on the frame, and also, by virtue of its hinge, enables the position of the imager to be adjusted as a function of the characteristics of the wearer, it nevertheless suffers from the following problems.

Once secured to the frame, the imager can be positioned correctly relative to the eye of the wearer by moving the hinge. If the imager is subsequently removed, then its non-rigid assembly is very difficult to keep in the same position. In other words, the relative position of the imager and of the electronic and optical system for generating light beams will be modified, so adjustment needs to be performed again each time the imager is put into place.

Furthermore, that hinge assembly is relatively bulky, which is inconvenient after it has been separated and needs to be put away, e.g. in the pocket of a garment, and it is of relatively unattractive appearance when secured to the frame of a pair of eyeglasses.

OBJECTS AND SUMMARY OF THE INVENTION

The invention solves those problems by a display suitable for securing to the pair of eyeglasses and enabling the position of the imager relative to the eye of the wearer to be adjusted once and for all by the wearer, said adjustment being conserved when the display is subsequently removed. The display of the invention can also be particularly compact, occupying little space.

The invention solves these problems, and to do so it provides a display for mounting on a pair of eyeglasses, the display comprising an electronic and optical system for generating light beams and an imager for shaping the light beams coming therefrom, the display including a releasable securing arrangement for releasably securing it on the pair of eyeglasses, and an adjustment arrangement for adjusting the position of said imager relative to the eye of the wearer, the display being characterized in that it comprises two elements, a first element carrying said removable securing arrangement, and a second element including said electronic and optical system and said imager, and connectable to said first element via said adjustment arrangement for adjusting the pupillary distance and including position-locking means for locking it in the adjusted position.

The display in accordance with the invention can be designed in such a manner as to be small and lightweight. It is thus easy to handle, portable, and can be put into a garment pocket. In addition, because of its light weight, it does not apply any stresses that might deform the frame.

The display in accordance with the invention can be situated close to a lens of the pair of eyeglasses because it uses a compact securing system. It therefore does not unbalance the frame of the eyeglasses.

In a preferred embodiment, said second element presents a protective cover, with only the imager extending outside said cover.

The display in accordance with the invention is thus protected against impacts that might damage it.

Preferably, said adjustment arrangement is constituted by a rail-and-slideway arrangement.

And advantageously, said rail is carried by said first element, and said slideway is carried by said second element.

In a variant, said adjustment arrangement may be positioned entirely on one or the other of said first and second elements.

Advantageously, said slideway is substantially parallel to the longitudinal axis of the imager.

Preferably, said locking means is constituted by a screw carried by said second element and serving to push a locking shoe into abutment against said rail of said first element when said rail is in place in said slideway.

The releasable securing arrangement may be constituted by a clip-fastening arrangement.

And advantageously, said clip-fastening arrangement comprises two tenons carried by said first element and designed to be clipped in two orifices arranges on the pair of eyeglasses.

The axes of said tenons may be distinct from each other.

Said clip-fastening arrangement may be associated with an abutment blade coming into abutment against the pair of eyeglasses.

Said imager may have an anti-friction arrangement on its face facing towards the lens of the pair of eyeglasses.

The invention also provides a frame for a pair of eyeglasses, the frame being designed to receive a display as specified above, the frame being characterized in that it includes a cavity for receiving said first element by mutual engagement.

Preferably, said cavity presents two clip-fastening orifices.

The axes of said orifices may be distinct from each other.

When the display is separated from the frame, the appearance of the frame is similar to that of a traditional frame for eyeglasses.

BRIEF DESCRIPTION OF THE DRAWINGS

The invention is described below in detail with the help of figures that merely show a preferred embodiment of the invention.

DETAILED DESCRIPTION

Figure 1:
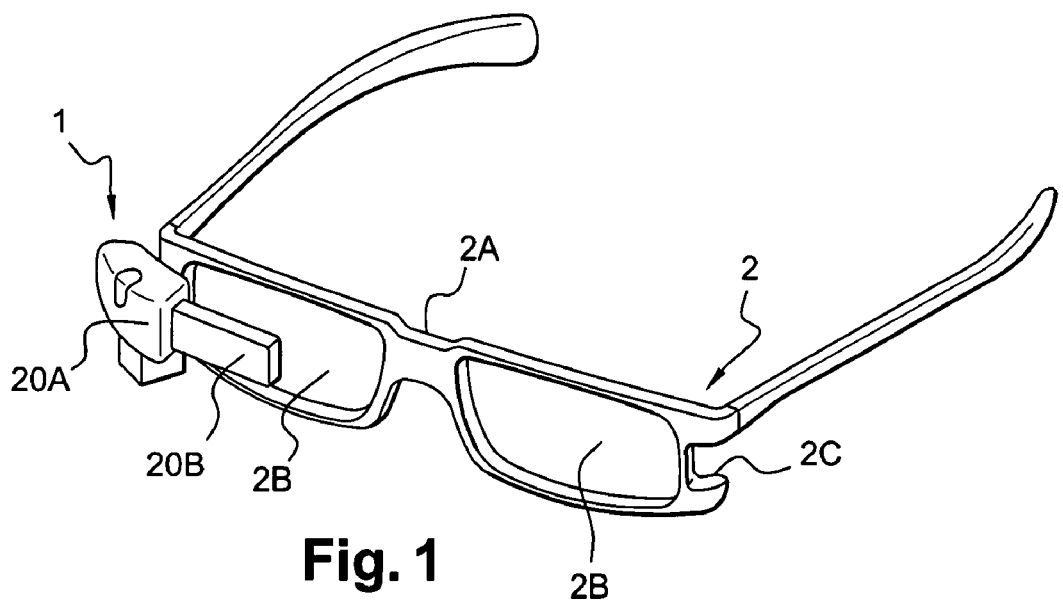
FIG. 1 is a perspective view of a pair of eyeglasses fitted with a display in accordance with the invention.

FIG. 1 shows a display 1 mounted on a pair of eyeglasses 2 comprising a frame 2A and two ophthalmic lenses 2B.

The display 1 comprises an electronic and optical light beam generator system 20A and an imager 20B for shaping the light beams coming from the generator system.

The display includes an arrangement enabling it to be releasably secured to the pair of eyeglasses 2, and an arrangement for adjusting the position of the imager 20B relative to the eye of the wearer, and more precisely for adjusting to the pupillary distance. It comprises two elements, a first element 10 carrying the releasable securing arrangement, and a second element 20 comprising the electronic and optical system 20A and the imager 20B and connectable to the first element 10 via the adjustment arrangement that includes position-locking means.

Figure 2:
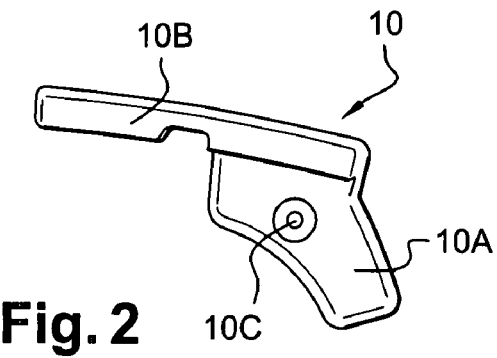
FIG. 2 is a fragmentary plan view of a display in accordance with the invention.
Figure 5:
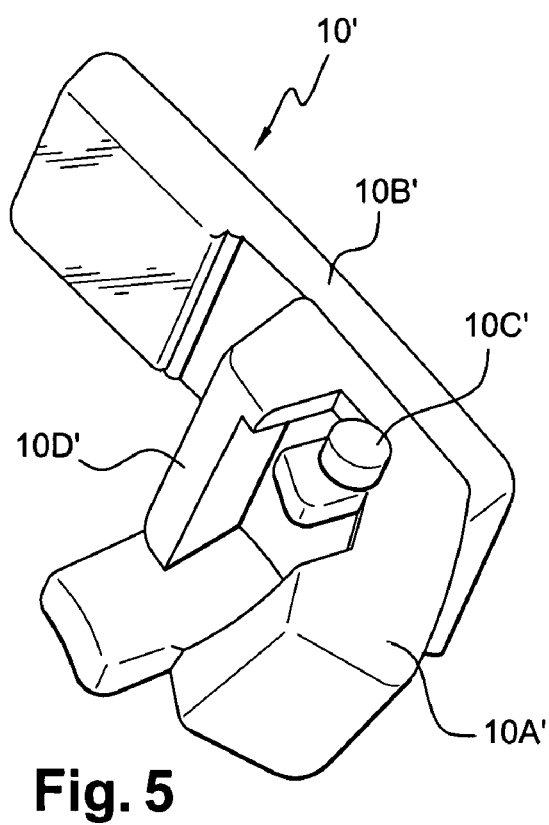
Figure 6:
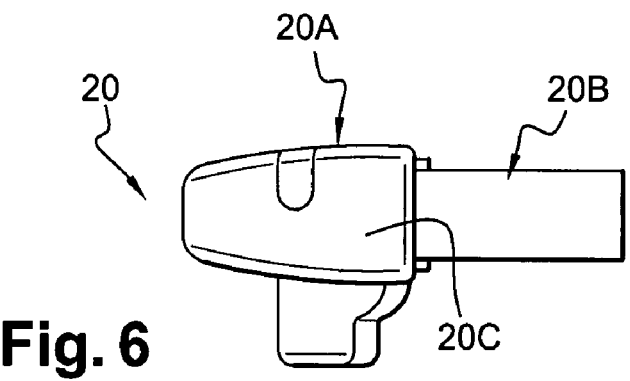
FIG. 6 is a fragmentary face view of a display in accordance with the invention.
Figure 7:
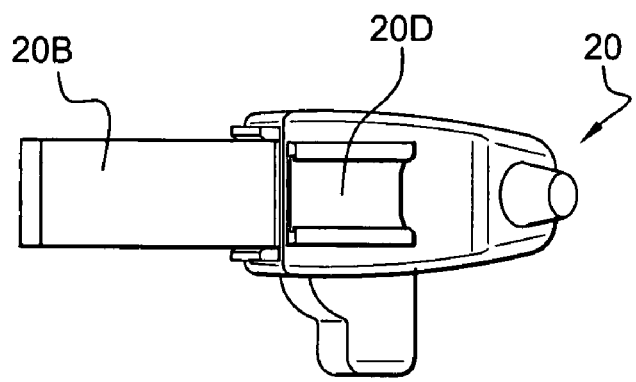
FIG. 7 is a fragmentary rear view of a display in accordance with the invention.
Figure 8:
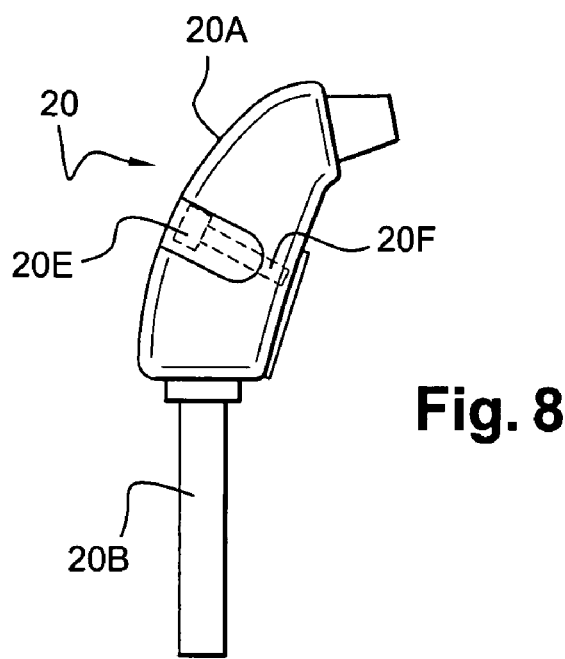
FIG. 8 is a fragmentary plan view of a display in accordance with the invention.

More precisely, the first element 10 is visible in FIGS. 2 and 5, and the second element 20 in FIGS. 6 to 8.

Figure 3:
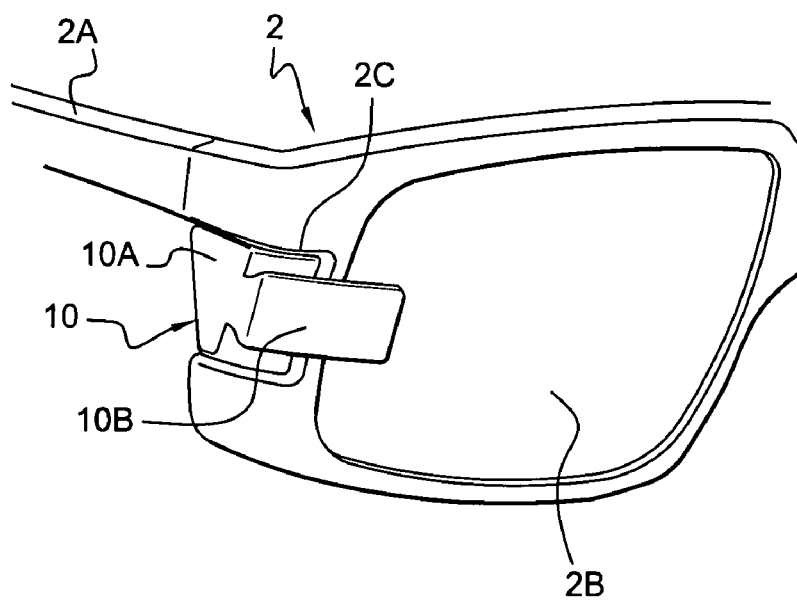
FIG. 3 is a perspective view of a pair of eyeglasses fitted with a portion of a display in accordance with the invention.

As shown in FIGS. 2 and 3, the first element 10 is formed by an engagement portion 10A for being received in a cavity 2C arranged on the frame 2A of the pair of eyeglasses. In the specific embodiment shown, this cavity is arranged on a side upright of the frame 2.

The cavity 2C presents two clip-fastening orifices (not shown) each of which receives in clip-fastening engagement a respective tenon 100 carried by the engagement portion 10A. The two tenons are disposed on two opposite faces thereof.

The releasable securing arrangement of the display is thus constituted by said clip-fastening arrangement carried by the first element 10.

The first element 10 also includes a rail 10B projecting over the front face of the pair of eyeglasses 2, when the first element 10 is mounted thereon.

Advantageously, the rail 10B is substantially parallel to the mean plane of the rim of the frame in which the lens 2B is mounted.

Figure 4:
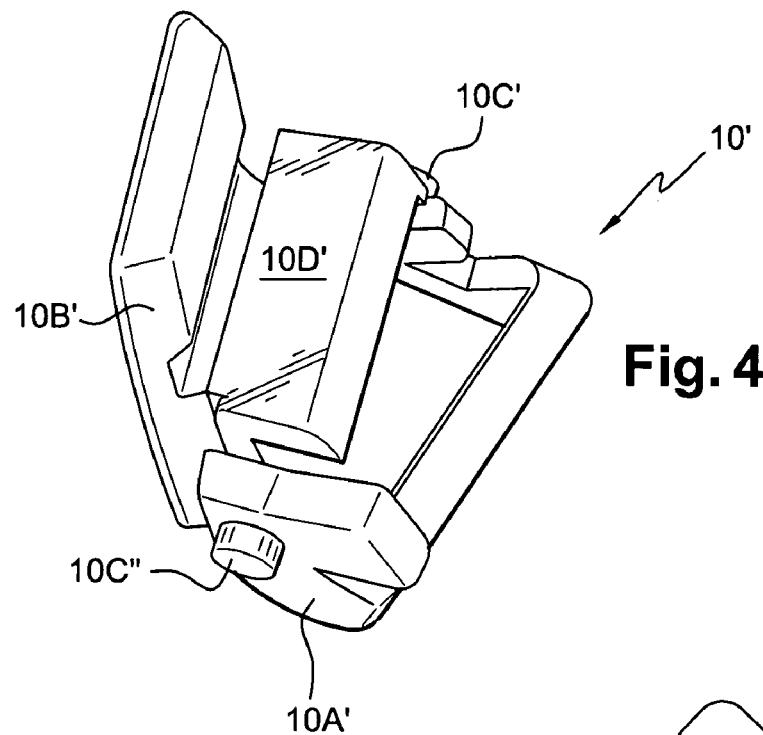
FIGS. 4 and 5 are perspective views of a variant embodiment of the element shown in FIG. 2.

FIGS. 4 and 5 show a variant embodiment 10' of the first element.

This variant differs from the first element 10 as described above with reference to FIG. 2 in that it has two improvements.

In this variant, the axes of the clip-fastening tenons 10C' and 10C" in the cavity 2C of the frame of the eyeglasses are distinct from each other and advantageously parallel, so as to prevent any turning of the first element 10' once clipped on the frame. In other words, the two corresponding clip-fastening orifices in the cavity 2C of the frame do not face each other on the two opposite faces of the cavity 2C, which are substantially horizontal as seen in FIG. 3.

Furthermore, the first element 10' includes a transverse blade 10D' enabling the element to come into abutment against the face of the cavity 2C in the frame, which is perpendicular to said two above-mentioned opposite faces and which is substantially vertical as seen in FIG. 3.

By means of these improvements, once the first element 10' has been clip-fastened in the cavity 2C of the frame, it is held very firmly in place, and the second element 20 can be positioned and adjusted on said element without difficulty or loss of adjustment.

The second element 20 can be seen in FIGS. 6 to 8.

This second element 20 includes the electronic and optical system 20C and the imager 20B, and it presents a protective cover 20C, with only the imager 20B being outside the cover. In the example shown, the imager 20B has its longitudinal axis substantially horizontal, and it is located close to one of the lenses 2B of the pair of eyeglasses.

This second element 20 carries a slideway 20D that is substantially parallel to the longitudinal axis of the imager 20B. This slideway 20D for receiving the rail 10B enables the second element 20 to be connected to the first element 10 by means of this rail-and-slideway adjustment arrangement that also includes position-locking means. The position-locking means are constituted by a screw 20E carried by the second element 20 and serving to push a locking shoe 20F to come into abutment against the rail 10B of the first element, when the rail is in place in the slideway 20D.

Furthermore, the imager 20B may include an anti-friction arrangement on its face that faces towards the lens 2B of the pair of eyeglasses, for the purpose of protecting said lens. The anti-friction arrangement may be constituted by a special coating on the face of the image that faces towards the lens.

On the first occasion the eyeglasses frame 2 is fitted with a display in accordance with the invention by a wearer, the first element 10 is clipped in a cavity 2C of the frame, as shown in FIG. 3.

The second element 20 is then connected to the first element 10 by placing the slideway 20D on the rail 10B of the first element, as shown in FIG. 1.

The relative position of the imager 20B and the eye of the wearer can then be adjusted by relative positioning of the rail in the slideway, and the optimum relative position is locked by tightening the screw 20E that is accessible from outside the cover 20C of the second element. In particular, this makes it possible to adjust the position of the imager as a function of the pupillary distance of the wearer.

When the wearer no longer seeks to use the display, the first element 10 can be removed together with the second element secured thereto. The frame of the pair of eyeglasses 2 then presents a pleasing appearance as shown in the right of FIG. 1. The display 1 is a part that is compact and rigid and that can be put away without any problem of size or loss of adjustment.

When the display is used subsequently, it suffices for the wearer to clip the display 1 in the corresponding cavity 2C of the frame of the pair of eyeglasses 2. Subsequent adjustment is no longer necessary for the same wearer.

Marking can be provided on the ophthalmic lens or on the rail in order to assist and facilitate adjusting the relative position of the imager and the eye of the wearer.

The invention is not limited to the embodiment described above.

Amongst other things, the display could be secured to a lens of a pair of eyeglasses instead of being secured to the frame thereof.

The invention claimed is:

1. A display for mounting on a pair of eyeglasses, the display comprising:
   an electronic and optical system for generating light beams;
   an imager for shaping the light beams coming therefrom;
   the display including a releasable securing arrangement for releasably securing the display on the pair of eyeglasses;
   an adjustment arrangement for adjusting the position of said imager relative to the eye of the wearer;
   two elements, a first element carrying said releasable securing arrangement; and
   a second element including said electronic and optical system and said imager, and connectable to said first element via said adjustment arrangement for adjusting the pupillary distance and including position-locking means for locking said second element in the adjusted position.

2. A display according to claim 1, wherein said second element presents a protective cover, with only the imager extending outside said cover.

3. A display according to claim 1, wherein said adjustment arrangement is constituted by a rail-and-slideway arrangement.

4. A display according to claim 3, wherein said rail is carried by said first element, and said slideway is carried by said second element.

5. A display according to claim 4, wherein said slideway is substantially parallel to the longitudinal axis of the imager.

6. A display according to claim 4, wherein said locking means is constituted by a screw carried by said second element and serving to push a locking shoe into abutment against said rail of said first element when said rail is in place in said slideway.

7. A display according to claim 1, wherein said releasable securing arrangement is constituted by a clip-fastening arrangement.

8. A display according to claim 7, wherein said clip-fastening arrangement comprises two tenons carried by said first element and designed to be clipped in two orifices arranges on the pair of eyeglasses.

9. A display according to claim 8, wherein the axes of said tenons are distinct from each other.

10. A display according to claim 7, wherein said clip-fastening arrangement is associated with an abutment blade coming into abutment against the pair of eyeglasses.

11. A display according to claim 1, wherein said imager has an anti-friction arrangement on its face facing towards the lens of the pair of eyeglasses.

12. A frame for a pair of eyeglasses, the frame being designed to receive a display according to claim 1, wherein the frame includes a cavity for receiving said first element by mutual engagement.

13. A frame according to claim 12, wherein said cavity presents two clip-fastening orifices.

14. A frame according to claim 13, wherein the axes of said orifices are distinct from each other.

* * * * *